Patented Apr. 20, 1954

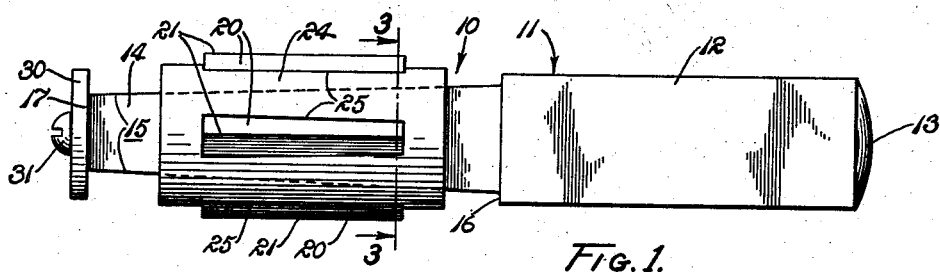

2,675,724

UNITED STATES PATENT OFFICE 2,675,724

INTERNAL PIPE WRENCH WITH EXPANDING JAWS

Arthur J. Beyer, Fresno, Calif.

Application March 27, 1950, Serial No. 152,220

1 Claim. (Cl. 81—72)

The present invention relates generally to tools and more particularly to a pipe tool adapted automatically to engage the inwardly disposed walls of pipes, tubes, and the like having bores formed therein.

Tools designed for the same broad purpose as the tool of the present invention have been in use for a considerable period of time but have serious disadvantages which the tool of the present invention seeks to correct. Tools of this character have heretofore required screw adjustment before use to regulate overall jaw diameter, with resultant waste in time and effort. Tools of this general character also conventionally require precise adjustment or regulation properly to engage the jaws or teeth thereof with the interior of a pipe or the like for subsequent turning thereof. Conventional tools of this character have longitudinally movable means for adjusting the jaws which are movably mounted and frequently become loosened or released from engagement due to the embedding of the jaws into the walls of the pipe or the like, if the adjustment is not continually regulated to extend the jaws.

It is therefore an object of the present invention to provide an improved internally engageable tool adapted for use in pipes, tubes and the like.

Another object is to provide a pipe tool that is automatically diametrically adjustable to accommodate pipes and the like of various sizes.

Another object is to provide a pipe tool in which simple relative longitudinal movement between the tool and its jaws effects simple engagement of the tool to the interior of the pipe or other cylindrical member.

Another object is to provide means in a pipe tool for automatically expanding the jaws or teeth thereof into biting engagement with a cylindrical member to be turned thereby on driven rotation of the tool.

Another object is to provide a pipe tool in which the angularity of the jaws is shifted to a more effective biting or engaging angle in response to drag imposed on the jaws on driven expansion of the jaws.

Other objects are to provide improved elements and arrangements thereof in a device of the character set forth that is durable, economical to manufacture, dependable and effective in its operation.

Still further objects and advantages will become apparent in the description in the subsequent specification.

Referring to the drawing:

Fig. 1 is a side elevation of a pipe tool designed and constructed in accordance with the principles of the present invention.

Fig. 2 is a fragmentary, enlarged, side elevation of the pipe engaging end of the pipe tool showing a portion of a retaining sleeve broken away to reveal a jaw of the tool in a longitudinal radial section.

Fig. 3 is a transverse radial section through the pipe engaging end of the tool in its retracted or at rest position as it normally would appear when removed from a pipe and not in use, as taken along line 3—3 in Fig. 1 of the drawing.

Fig. 4 is a view similar to Fig. 3 but shows the tool inserted into a pipe or other tubular member to be turned, shown in section, with the tool located to engage the jaws thereof with the interior surface of the pipe.

Fig. 5 is an exploded perspective view of the composite parts of the pipe tool.

Fig. 6 is a transverse, radial, section through the shank portion of the tool showing a modified or second form of the faces of the shank.

Referring in greater detail to the drawing:

The pipe tool of the present invention is indicated generally by the reference numeral 10 and has an elongated body portion 11. The body portion of the tool is made of tool steel or other material which is adapted to be hardened and has a head portion 12 of substantially square cross section having a rounded terminal end 13, and a shank portion 14 which is of substantially square cross section with each face 15 thereof tapered from a larger dimension adjacent to the head to a smaller dimension at the outer terminal end thereof. The shank is generally frusto-pyramidal in form. The juncture between the head 12 and the shank 14 provides a shoulder 16, the head being larger than the shank. The outer terminal end of the shank 14 is squared as at 17 at right angles to the axis of the body 11 of the tool and is formed with a coaxial tapped opening 18 into the outer end thereof. The four tapered faces 15 of the shank 14 are tempered and drawn to the desired hardness so that they resist wear and resist twisting thereof during use of the tool. The head 12 of the tool is also tempered and drawn to a hardness sufficient to resist twisting of the tool during normal use. Although the shank is described as being substantially square is cross section it will be clearly apparent that all that is required of the shank is that it provide peripherally disposed faces which extend from positions concentric to the axis of the body transversely of the body to positions relatively radially outwardly thereof.

The tool is provided with a plurality of jaws 20 which are equal in number to the faces of the shank 14. Each of the jaws 20 is of substantially triangular prismal form having an outer engaging edge 21 and an inner flat surface 22 which is tapered relatively to the outer engaging edge 21. Each jaw is located against one of the faces 15 of the shank 14 with the inner flat surface 22 in sliding engagement therewith and with the taper thereof complementarily located relative to the taper of the shank so that the outer engaging edge 21 of each jaw 20 is substantially parallel to the axis of the body 11 of the tool. Each end of each of the jaws 20 is recessed providing relatively thin projections 23 at each end of each jaw.

A cylindrical sleeve 24 concentrically circumscribes the shank 14 of the tool and is formed with a plurality of rectangular slots 25 radially therethrough, as seen in Fig. 5. In the present instance, four of such slots are provided at 90° intervals and are narrower than the width of the jaws adjacent to the inner flat surfaces 22 thereof. The length of the slots 25 is such that the outer engaging edge 21 of each jaw extends radially outwardly through the slots with the end projections 23 located within the sleeve beyond the ends of the rectangular slots. There is a degree of looseness provided between the shank, jaws, and sleeve 24 so that the jaws have both longitudinal and radial movement relative to the shank. The sleeve 24 and jaws 20 constrained thereby are all appreciably shorter than the length of the shank so that the sleeve and jaws may move longitudinally of the shank. The plurality of jaws are urged radially outwardly from the shank by recessing at 26 the inner flat surface 22 of each of the jaws 20. Each recess 26 is substantially rectangular in shape and adapted to receive a leaf spring 27. Each leaf spring is bowed arcuately in its length so that the ends thereof engage the bottom of the respective recess 26 and the bowed portion thereof engages the respective face of the shank 14. The leaf springs urge the jaws radially outwardly of the shank for more convenient engagement of the outer engaging edge of the jaws with the interior surface of a pipe or other cylindrical member to be rotated thereby.

A washer 30 is located coaxially against the squared end 16 of the shank 14 and is held securely in position by a screw 31 extending through the washer and threadedly received into the tapped opening 17 in the outer terminal end of the shank 14. The outer diameter of the washer 30 is greater than the inner diameter of the sleeve 24 which precludes the sleeve and jaws from becoming inadvertently removed from the outer end of the shank and the sleeve and constrained jaws 20 are maintained slidably on the shank portion 14 of the tool 10.

As illustrated in Figure 6 of the drawing, the shank 14 of the body 11 may be formed with the faces of the shank of concave shape at 33 in transverse radial section. By forming the faces of concave form, when the jaws 20 are actuated outwardly to increased diameter on relative rotational movement between the shank and the jaws, the teeth are more quickly moved to increased diameter and tipped for increased biting efficiency.

*Operation*

The operation and utility of the present invention is believed to be apparent from the foregoing description and is briefly summarized at this point. With the plurality of jaws in assembled relation on the shank and constrained thereon loosely by means of the sleeve 24 and by washer 30, the tool is adapted to be used for rotating cylindrical members such as pipe or pipe fittings that cannot be engaged on their exterior by the common pipe wrench. The tool is especially useful in instances where a pipe has broken off to a short length internally of a pipe fitting so that the piece or fragment cannot be removed by the ordinary pipe wrench or eased out. In such instances it is necessary to engage the interior diameter of the piece or fragment of pipe in order to remove it from the pipe fitting. The tool of the present invention is made in various sizes to accommodate standard pipe sizes and the like. Before the pipe tool is inserted into a pipe, the sleeve 24 and the jaws 20 constrained thereby are slid longitudinally outwardly on the tapered shank toward the washer 30. This causes movement of the jaws 20 to a smaller diameter because of the tapered relation between the shank and the inner flat surface 22 of each of the jaws. The tool is thereafter inserted into the pipe or tubular member to be turned, thereby, and the body 11 of the tool moved inwardly of the sleeve which, due to the tapered shank, urges the jaws to a greater diameter and into simple engagement with the interior surface of the pipe or of the cylindrical member. The leaf springs 27, inserted between each jaw 20 and the respective face of the shank 14, constantly urges the jaws outwardly and tends to maintain the jaws in simple engagement with the interior surface of the pipe.

After the jaws are brought into engagement with the interior surface of a pipe or other cylindrical member, the head 12 of the tool is engaged and rotated by means of a wrench of any form capable of firm engagement with the square section of the head. Of course, a handle integral with the head may be provided if desired. Initial rotation of the body 11 causes the faces of the shank 14 to slide transversely of the inner flat surfaces 22 of the jaws 20 inasmuch as the jaws are held rotatably stationary due to the engagement of their outer engaging edges 21 with the interior surface of the pipe. This rotation of the shank relative to the jaws causes the jaws to be engaged by portions of their respective faces 15 relatively outwardly of portions of their faces engaged when the jaws are located centrally of their respective faces. This relative forward rotative motion of the shank moves the jaws to a comparatively greater diameter and causes the outer engaging edges of the jaws to obtain a biting or gouging engagement with the interior surface of the pipe so that the pipe is securely held by the jaws for further rotation of the body 11.

By reference to Fig. 4 the significant automatic expansion of the jaws 20 and driving engagement with the pipe is readily apparent. Frictional engagement of the edges 21 with the pipe resists rotational travel of the jaws 20 as the body 11 is rotated. As the body rotates the jaws slide relative to the peripheral surfaces thereof and are urged relatively outwardly. The slidable movement of the surfaces 22 of the jaws on the surfaces 15 of the shank 14 not only forces the jaws outwardly but also disposes the jaws at a more advantageous biting angle in engagement with the interior of the pipe. Thus continued body rotation relative to an engaged pipe progressively increases dependability of pipe engagement. Resistance of the pipe to rotation is translated in response to body rotation into increased dependability of engagement. For example, when a jaw is brought into pipe engagement while located centrally of its engaged surface 15 of the shank, surfaces of the jaw at opposite sides of the edge 21 are substantially equally angularly related to the pipe at the point of contact. As the shank is rotated relative to the jaws, not only are the jaws thrust outwardly but the angle of incidence of the jaws relative to the interior of the pipe engaged thereby is reduced as the jaw slides transversely of its face of the shank for improved driving connection with the pipe. Obviously reversed rotation of the body has the opposite effect assuring instant release without jamming. Thus, each jaw has increased, or a more advantageous biting or embedding engagement with the interior surface of the pipe. This advantageous angularity of the jaws prevents accidental slipping of the jaws in their engagement with the interior surface of the pipe while the shank is forcibly turned to rotate the tool and the pipe.

The greater the force applied to the head 12 to rotate the shank 14 and jaws 20 in engagement with the interior surface of the pipe, and the greater the resistance to turning of the pipe, the greater is the tendency of diametrically opposite jaws to move to a greater diameter and hence increase the biting engagement of the jaws with the interior surface of the pipe. Therefore, once the jaws have become engaged with the interior surface of the pipe it is substantially impossible for the jaws to slip unless the interior of the pipe is so hard and slick as to make engagement by any means virtually impossible. Generally speaking, the engagement and grip achieved by the device of the present invention are equivalent, or superior, to that achieved by conventional pipe wrenches adapted to engage the peripheries of pipes.

With an understanding of the present invention, it will be clearly apparent that the pipe engagement of the jaws 20 and the improved engaging attitude achieved by transverse slidable movement of the jaws on their respective faces 15 may be appreciably improved by providing a shank 14 having somewhat concave faces, as indicated at 33 in Fig. 6. As forced rotation of the shank 14 causes transverse sliding movement of jaws 20 mounted longitudinally of the faces 33, in the manner described for the faces 15 in connection with Fig. 4, it will be apparent that an accelerated expansion of the jaws into pipe engagement and an accelerated tipping for improved attitude of pipe engagement results. When the shank 14 is provided with appreciably concave faces, as at 33, the tool is employed in the same manner as previously described, the operation being identical to that described for the flat faces 15 except that the jaws 20 have the accelerated expanding and grasping effects.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claim so as to embrace any and all equivalent devices and structures.

Having described my invention what I claim as new and desire to secure by Letters Patent is:

A pipe tool comprising an elongated body having a circumscribing shoulder and a frusto-pyramidal shank formed longitudinally of the body adjacent to the shoulder and providing endwardly convergent tapered faces, an elongated jaw of triangularly prismal form positioned longitudinally of each face of the shank and each having an inner surface rested on its respective face of the shank, the jaws being oppositely and complementarily tapered relative to the shank and providing longitudinally extended substantially parallel pipe engaging edges, a sleeve mounted in circumscribing relation to the jaws on the shank and having longitudinal openings formed therethrough through which the jaws are extended, the sleeve being adjustably positioned longitudinally of the shank to precondition the jaws for pipe engagement and being rotatably movable thereon incident to frictional engagement of the jaws with the interior of a pipe during body rotation to effect outward thrusting of the jaws incident to travel thereof transversely of their respective faces of the shank, resilient means mounted between the jaws and their respective faces of the shank, and means mounted on the end of the shank in association with the sleeve limiting endward movement of the sleeve.

References Cited in the file of this patent

UNITED STATES PATENTS

| Number | Name | Date |
| --- | --- | --- |
| 305,035 | Lytle | Sept. 9, 1884 |
| 532,765 | Clever | Jan. 22, 1895 |
| 573,325 | Gates | Dec. 15, 1896 |
| 705,724 | Upson | July 29, 1902 |
| 1,075,753 | Bastian et al. | Oct. 14, 1913 |
| 1,142,660 | Bellaire | June 8, 1915 |
| 1,415,734 | Thomas et al. | May 9, 1922 |
| 1,507,645 | Wedgeworth | Sept. 9, 1924 |
| 1,535,534 | McDonald et al. | Apr. 28, 1925 |
| 1,822,685 | Wilson | Sept. 8, 1931 |